United States Patent
Tuilier

(10) Patent No.: US 7,817,992 B2
(45) Date of Patent: Oct. 19, 2010

(54) METHOD FOR UPDATING A PERSONAL DATA FILE IN MOBILE UNITS OF COMMUNICATION NETWORKS

(75) Inventor: Edmond Tuilier, Marseilles (FR)

(73) Assignee: Gemalto, S.A., Meudon (FR)

( * ) Notice: Subject to any disclaimer, the term of this patent is extended or adjusted under 35 U.S.C. 154(b) by 371 days.

(21) Appl. No.: 10/479,067

(22) PCT Filed: May 31, 2002

(86) PCT No.: PCT/FR02/01856

§ 371 (c)(1),
(2), (4) Date: Jun. 14, 2004

(87) PCT Pub. No.: WO02/098146

PCT Pub. Date: Dec. 5, 2002

(65) Prior Publication Data

US 2004/0235467 A1    Nov. 25, 2004

(30) Foreign Application Priority Data

May 31, 2001 (FR) ................................. 01 07141

(51) Int. Cl.
*H04M 3/00* (2006.01)
(52) U.S. Cl. .................... 455/418; 455/419; 455/420; 455/432.2
(58) Field of Classification Search ............. 455/432.1, 455/517, 422.1, 451, 466, 445, 458, 418–420, 455/432.3, 463, 518–519; 709/204–207
See application file for complete search history.

(56) References Cited

U.S. PATENT DOCUMENTS

| 5,814,798 | A  | * | 9/1998  | Zancho ........................ 235/380 |
| 6,070,085 | A  | * | 5/2000  | Bender et al. ................ 455/522 |
| 6,092,133 | A  | * | 7/2000  | Erola et al. .................. 710/301 |
| 6,175,741 | B1 | * | 1/2001  | Alperovich .................. 455/458 |
| 6,216,014 | B1 | * | 4/2001  | Proust et al. ................. 455/558 |
| 6,301,609 | B1 | * | 10/2001 | Aravamudan et al. ....... 709/207 |
| 6,820,204 | B1 | * | 11/2004 | Desai et al. .................... 726/6 |
| 6,895,428 | B2 | * | 5/2005  | Hicks .......................... 709/206 |
| 7,190,956 | B2 | * | 3/2007  | Dorenbosch et al. ..... 455/435.1 |
| 2008/0228887 | A1 | * | 9/2008 | Robertson et al. ........... 709/206 |

FOREIGN PATENT DOCUMENTS

| EP | 1 024 674 | 8/2000 |
| WO | 99 29127  | 6/1999 |

* cited by examiner

*Primary Examiner*—Raymond S Dean
(74) *Attorney, Agent, or Firm*—Buchanan Ingersoll & Rooney, PC

(57) ABSTRACT

The invention concerns a method for updating in at least a first mobile communication apparatus (48) of a network, in particular of the GSM type, a personal data file concerning at least a correspondent of the user of the first communication apparatus, said correspondent being equipped with a second mobile communication apparatus (60) and having modified at least one personal information concerning him. The invention is characterized in that it comprises the following main steps which consist in: (a) detecting in said second mobile communication apparatus (60) the call number of said first mobile communication apparatus (48), and (b) transmitting to at least said first mobile communication apparatus (48) said modified personal information.

14 Claims, 1 Drawing Sheet

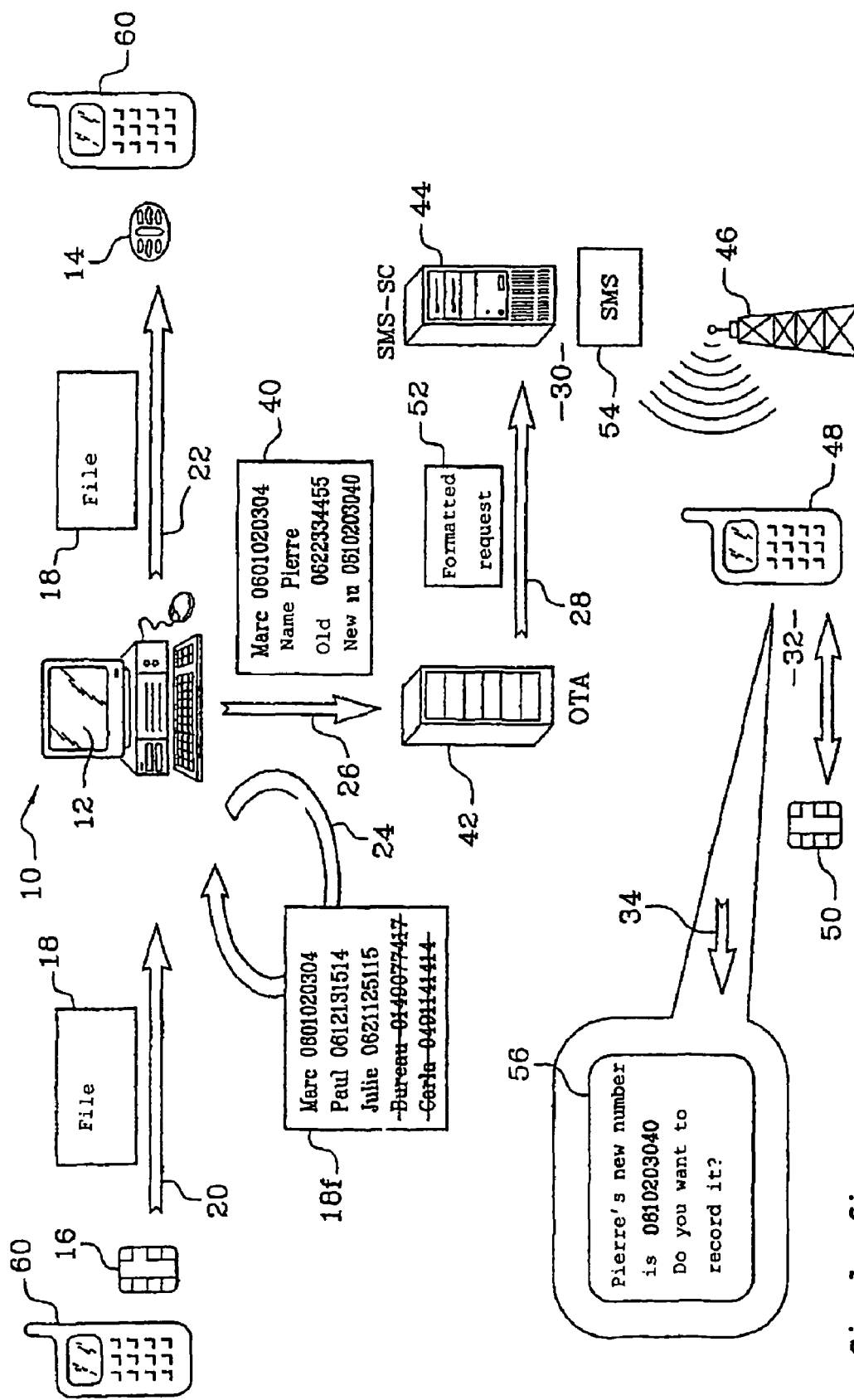

METHOD FOR UPDATING A PERSONAL DATA FILE IN MOBILE UNITS OF COMMUNICATION NETWORKS

The invention concerns the field of GSM (Global System for Mobile Communication) type communication networks and, more particularly in this field, a method for updating, in the mobile apparatuses of the networks, a personal information file, for example a telephone directory.

Each subscriber of a network possesses a SIM (Subscriber Identity Module) card. This SIM card is personalised so as to enable the subscriber to have access to the various applications to which he has subscribed. In addition, it contains in memory personal information, such as telephone directory, diary, etc. files generally entered manually by the subscriber.

When a subscriber to a communications network, for example of GSM type, wishes to benefit from new services, he must sometimes change SIM card; in this case, his call number is modified. Following this change of call number, the directories of the correspondents of the subscriber are no longer up to date for this subscriber whose call number has changed.

Similarly, other events such as moving house, a change of bank account, or more generally a modification of personal data, can have the same effect for the personal data files within the apparatuses of certain correspondents.

One aim of the present invention is to implement a method in a communication network, for example of GSM type, for updating the personal data files of the correspondents of a subscriber following such an event.

The technical problem posed breaks down into two complementary sub-problems:
the first consists of sending the modified information to the correspondents;
the second consists of using this information for the updating proper of the data files of the correspondents.

The method of the invention can be applied to the changing of any personal information, for example the address of a subscriber or his call number, a change which is transmitted to all the correspondents of this subscriber.

The invention concerns a method of updating, in at least one first mobile communication apparatus of a network, for example of GSM type, a file of personal information relating to at least one correspondent of the user of the said first communication apparatus, the said correspondent being equipped with a second mobile communication apparatus of GSM type and having modified at least one item of personal information concerning him,
characterised in that it comprises the following main steps consisting of:
(a) detecting in the second mobile communication apparatus, by means of this second apparatus or a terminal connected to the network, the call number of the first mobile communication apparatus; and
(b) transmitting, by means of a communication on the network to at least one first mobile communication apparatus, the said personal information that is modified.

Step (a) can comprise the following steps:
($a_1$) filtering the data of the second mobile communication apparatus in order to deduce therefrom at least one correspondent affected by the personal information that has been modified;
($a_2$) detecting the call number of the first apparatus of each correspondent filtered.

The steps (a) or ($a_1$, $a_2$) are carried out either by the second mobile communication apparatus, or by an appropriate terminal which is connected to the communication network.

Step (b) can comprise the following steps:
($b_1$) sending an E-SMS message to the first communication apparatus;
($b_2$) executing an application contained in the E-SMS message in the first mobile communication apparatus.

The message can contain in particular the old and the new value of the information to be modified.

The formatted request comprises:
either a message in the form of an instruction ordering activation of an application for updating a file;
or a message in the form of an instruction for loading an application for updating a file;
or an information message in text form.

Other characteristics and advantages of the present invention will emerge from a reading of the following description of a particular example embodiment, the said description being given with the accompanying drawing in which:
the single FIGURE is a diagram illustrating the method according to the invention.

An example embodiment of the invention is described below in the case of a call number change by a subscriber of a communications network.

A subscriber, Pierre, to a network, in particular of GSM type, who possesses a mobile apparatus 60 containing a SIM card 16 and who wishes to benefit from services other than those to which he has access, goes to a point of sale 10 for these services. At this point of sale 10, a terminal 12, operated by a salesperson, makes it possible to personalise a new SIM card 14 which will replace the old SIM card 16 of the mobile apparatus 60.

One of the operations of this personalisation consists of transferring in particular the directory file from the old SIM card 16 to the new SIM card 14, this directory file being referred to as the ADN (Abbreviated Dialling Number) file 18. This extraction (arrow 20) of the ADN file 18 from the old SIM card 16 and its recording (arrow 22) in the new SIM card 14 is performed by means of appropriate software contained in the terminal 12.

From the file 18, the terminal 12 uses software (arrow 26) which makes a service request 40 for each correspondent of the subscriber Pierre to the platform 42 of the network operator.

In one preferred embodiment, each request 40 comprises:
the call number of the correspondent to be contacted, for example, Marc;
the name of the subscriber Pierre who has just changed SIM card;
the old call number of Pierre; and
the new call number of Pierre.

In a variant, depicted in the FIGURE, the operator will first implement (arrow 24) a filtering of the ADN file 18 in order to eliminate from the directory the correspondents with a fixed telephone set and keep only those having a mobile telephone set, for example those having the prefix "06" or "+336" in the case of a French network.

The ADN file 18 becomes the file 18f in which there is drawn up a list of correspondents with a mobile telephone set, for example Marc, Paul and Julie, the correspondents with a fixed telephone set, Office and Carla, having been eliminated since the method of the invention would be ineffective on these fixed telephone sets.

From this filtered file 18f, the terminal 12 makes a service request 40 for each correspondent with a mobile telephone set (Marc, Paul, Julie) to the platform 42 of the network operator according to the principle described above.

In another variant of the invention, a second filtering of the ADN file is provided in order to determine a subset of affected correspondents for whom the change that has occurred is considered relevant. For example, in the case of a change of bank account, only the correspondents with whom the subscriber has business relationships with a direct debit authorisation will have to be identified according to information entered by the subscriber in his improved ADN personal file.

The service request 40 is converted (arrow 28) by the so-called OTA platform 42 into a formatted request 52 which is transmitted to an SMS-SC (Short Message Service-Service Centre) message server 44.

The server 44 converts this request 52 into an E-SMS message 54, according to an existing method 30, a message which is transmitted (antenna 46) to the mobile telephone set 48 of Marc.

According to the method of the invention, this message 54 triggers in the SIM card of Marc a number of operations (arrow 32) which can consist of:
  informing Marc (arrow 34) by a written message 56 on his screen that the call number of Pierre has changed;
  asking Marc whether he wishes to change this number for the new one; and, in the event of a positive reply,
  searching for the call number of Pierre in the ADN file on the SIM card of Marc;
  in the event of a positive result, modifying the call number of Pierre in the ADN file on the SIM card of Marc;
  in the event of a negative result, adding the name of Pierre and his new call number into the ADN file on the SIM card of Marc.

These various operations can be carried out either by software residing in the SIM card of the mobile of Marc and triggered by the E-SMS message 54, or by software contained in the E-SMS message itself and downloaded into the mobile of Marc, executed and then deleted. These messages 54 are of E-SMS (Enhanced Short Message Service) type, and are provided for performing control instructions. An automatic update can thus be carried out.

The choice between one or other of the two solutions is made by the OTA platform 42 which knows the type of SIM card of each subscriber to the network, the card type indicating the applications with which the SIM card is provided and, in particular, whether or not the SIM card contains resident software for updating the directory of the subscriber.

In the case of the existence of software residing in the SIM card of the subscriber Marc, this resident software is different depending on the SIM card type and its remote triggering requires different messages.

The OTA platform 42 is provided for supplying the appropriate formatted requests according to the card type of the subscriber. The following few examples are cited:
  an E-SMS message for loading or triggering a script in the cards of the family marketed under the brand name "GemXplore 98" of the applicant;
  a message according to a standardised protocol for loading or triggering a JAVA application in the cards of the family marketed under the brand name "GemXplore Xpresso" of the applicant;
  a simple SMS information text message for other cards. In this last case, the updating of the data file can then be partially manual.

The method thus described is well suited to all SIM cards conforming to the SIM toolkit standard, phase 2 and above. Use will be made for example of cards marketed by the applicant under the brand name "GemXplore 98".

The point of sale terminal 12 must be provided for:
  extracting, from the ADN file 18, the numbers of the correspondents of Pierre who have GSM type telephones;
  making the service requests 40 each containing
    the GSM number of a correspondent of Pierre;
    the name of Pierre who has just changed GSM call number;
    the old GSM call number of Pierre; and
    the new GSM call number of Pierre.

The invention has been described in an application to the updating of directories of the GSM correspondents of a GSM subscriber who changes call number, but it applies to the updating of any modification of personal information of a subscriber of a GSM or similar type network, for example his address or fax number.

In a variant of the invention, the personal data is modified manually by the subscriber by means of the keypad of his mobile, and there is no passage through a point of sale 12, nor change of SIM card.

The applications of filtering a subset of correspondents concerned by the modification 24 and then of sending requests to the SMS-SC centre are in that case contained and executed directly by the mobile 60.

The invention claimed is:

1. A method of updating, in at least one first mobile communication apparatus of a network, a file of personal information relating to at least one correspondent of the user of said first communication apparatus, said correspondent being equipped with a second mobile communication apparatus and having modified at least one item of personal information concerning said correspondent, comprising the following steps:
  (a) detecting the call number of said first mobile communication apparatus, based on data stored in said second mobile communication apparatus;
  (b) determining whether said first mobile communication apparatus contains a software program that is executed in said first mobile communication apparatus to update said file of personal information;
  (c) transmitting, by means of a communication on the network to at least said first mobile communication apparatus, said personal information that is modified, by sending an E-SMS ("Enhanced Short Message Service") message to said first communication apparatus,
  (d) transmitting said software program with said E-SMS message if a determination is made that said first mobile communication apparatus does not contain said software program; and
  (e) executing said software program in said first communication apparatus to update said file of personal information.

2. A method according to claim 1, wherein step (a) comprises the following steps:
  ($a_1$) filtering the data of the second mobile communication apparatus to deduce therefrom at least one correspondent affected by the personal information that has been modified; and
  ($a_2$) detecting the call number of the first apparatus of each identified correspondent.

3. A method according to claim 1 wherein step (a) is carried out by said second mobile communication apparatus via software recorded in a SIM card.

4. A method according to claim 1 wherein step (a) is carried out by a terminal which is connected to the network.

5. A method according to claim 1, wherein the message sent in step (c) includes a message in text form informing the user of the first mobile communication apparatus that an item of personal information of one of his correspondents has been modified.

6. A method according to claim 1, wherein the message contains the old and the new value of the information to be modified.

7. A method according to claim 1, wherein the software program contained in the message is executed in a SIM card of the first apparatus during step (e).

8. A method according to claim 1, wherein the information that has been modified is an address of the user of the second mobile communication apparatus.

9. A method according to claim 1, wherein the information that has been modified is a fax number of the user of the second mobile communication apparatus.

10. A method according to claim 1, wherein the information that has been modified is a call number of the user of the second mobile communication apparatus.

11. A method according to claim 9, wherein the message also contains the old number that has been modified and the new number resulting from the modification.

12. A method according to claim 1, wherein the software program for updating the file of personal data in at least one first communication apparatus executes the following steps:
   recognizing in said file of personal data of at least one first communication apparatus the value modified by the correspondent; and
   automatically modifying this recognized value with the new value.

13. A method according to claim 10, wherein the message also contains the old number that has been modified and the new number resulting from the modification.

14. The method of claim 1, further including the step of deleting the software program from said first mobile communication apparatus after said program is executed to update said file of personal information.

* * * * *